US010213636B1

(12) United States Patent
Cutting et al.

(10) Patent No.: US 10,213,636 B1
(45) Date of Patent: Feb. 26, 2019

(54) FLUID CONTROL VALVE

(71) Applicant: Tyco Fire Products LP, Lansdale, PA (US)

(72) Inventors: Sean E. Cutting, West Warwick, RI (US); Jesus Tapia Negrete, Escondido, CA (US); Matthew Craig Willliams, Westport, MA (US); James M. Martin, Warwick, RI (US); Jeffrey M. Brighenti, Fall River, MA (US)

(73) Assignee: Tyco Fire Products LP, Lansdale, PA (US)

( * ) Notice: Subject to any disclaimer, the term of this patent is extended or adjusted under 35 U.S.C. 154(b) by 0 days.

(21) Appl. No.: 15/334,844

(22) Filed: Oct. 26, 2016

Related U.S. Application Data

(60) Provisional application No. 62/246,434, filed on Oct. 26, 2015.

(51) Int. Cl.
F16K 31/08 (2006.01)
A62C 37/42 (2006.01)
A62C 37/48 (2006.01)
F16K 17/38 (2006.01)
A62C 37/11 (2006.01)

(52) U.S. Cl.
CPC .............. A62C 37/42 (2013.01); A62C 37/11 (2013.01); A62C 37/48 (2013.01); F16K 17/38 (2013.01); F16K 17/383 (2013.01); Y10T 137/87153 (2015.04)

(58) Field of Classification Search
CPC ....... F16K 17/38; F16K 17/383; A62C 37/42; A62C 37/11; A62C 37/48

USPC .......................... 137/72, 73, 79, 594; 251/153
See application file for complete search history.

(56) References Cited

U.S. PATENT DOCUMENTS

| | | | | | |
|---|---|---|---|---|---|
| 346,571 | A | * | 8/1886 | Ashcroft | A62C 37/10 137/72 |
| 2,604,790 | A | * | 7/1952 | Derby | F15B 15/10 49/2 |
| 3,911,940 | A | * | 10/1975 | Johnson | A62C 37/08 137/79 |
| 3,924,687 | A | * | 12/1975 | Groos | A62C 37/08 169/19 |

(Continued)

OTHER PUBLICATIONS

TYCO Series MJC Multiple Jet Controls Data Sheet Published Oct. 2014.*

Primary Examiner — Umashankar Venkatesan
(74) Attorney, Agent, or Firm — Foley & Lardner LLP

(57) ABSTRACT

A thermally responsive fluid control valve includes a thermally responsive actuating assembly and a body having an inlet, at least one outlet, and a valve seat formed internally of the inlet. An axially translating sealing assembly is supported in a seated position against the valve seat by the thermally responsive actuating assembly and the sealing assembly has an unseated position upon operation of the actuating assembly. The sealing assembly includes a sealing member having an impact surface for redirecting fluid from the inlet to the at least one outlet and a rod member with an outer surface in a surface engagement with the opening of a cover plate and/or the actuating assembly to orient the sealing member such that the impact surface directs fluid flow to the outlets.

21 Claims, 6 Drawing Sheets

(56) References Cited

U.S. PATENT DOCUMENTS 6,367,559 B1 * 4/2002 Winebrenner ......... A62C 31/02
169/37
2017/0340911 A1 * 11/2017 Meyer .................... A62C 37/42

* cited by examiner

_US 10,213,636 B1_

FLUID CONTROL VALVE

PRIORITY CLAIM, CROSS-REFERENCE & INCORPORATION BY REFERENCE

This application claims the benefit of priority of U.S. Provisional Application No. 62/246,434, filed Oct. 26, 2015 and which is incorporated by reference in its entirety.

TECHNICAL FIELD

The present invention relates generally to fire protection systems and more specifically to fluid control valves for use in fire protection systems.

BACKGROUND ART

Thermally responsive fluid control devices known in the art are used or incorporated in fire protection systems to control the flow of a firefighting fluid or medium to a spray device, such as for example, a nozzle or non-automatic (open) sprinkler. One known thermally responsive fluid control device is the MODEL TCV-1 THERMAL CONTROL VALVE from Tyco Fire Products LP shown and described in Tyco Fire Products LP Data Sheet TFP1345 entitled, "Model TCV-1 Thermal Control Valve 1 and 1½ Inch (DN25 and D40), 175 psi (12.1 bar) Thread×Thread" (January 2005). Another known thermally responsive fluid control device is the MJC MULTIPLE JET CONTROL VALVE from Tyco Fire Products LP, shown and described in Tyco Fire Products Data Sheet TFP1346 entitled, "Series MJC Multiple Jet Controls DN20, DN25, DN40, DN50, 12 bar BSPT Inlet & Outlet Threads" (October 2014). Each of these known thermally responsive fluid control valves includes an integrated or internal thermally responsive actuator for actuating the valve. Generally, each device includes an internal sealing assembly that is held in the sealed position by either a fusible assembly or a thermally responsive bulb. Once the fusible assembly separates or the bulb fractures in response to the higher temperatures from a fire, the internal sealing assembly moves to an open position and fluid at the inlet of the valve is discharged from the valve outlets for delivery to the fluid distribution devices.

It is desirable to provide for a thermally responsive fluid control valve having a simpler actuating assembly and operation as compared to known thermally responsive fluid control valves. Additionally, it is desirable to provide for a thermally responsive fluid control valve having a fluid flow output not previously known in prior thermally responsive fluid control valves.

DISCLOSURE OF INVENTION

Preferred embodiments of a fluid control valve are provided having a body including an inlet passageway, at least one discharge passageway outlet and a valve seat formed internally of the inlet passageway, the inlet passageway being centered and axially aligned along a first valve axis, and the at least one discharge passageway being aligned along a second valve axis intersecting the first valve axis. A thermally responsive actuating assembly having a base is mounted to the body. A sealing assembly is supported in a seated position by the thermally responsive actuating assembly. The sealing assembly has an unseated position upon operation of the actuating assembly to provide a preferred fluid flow rate ranging between (80-160) GPM for a delivered fluid inlet pressure of (25-45) PSI. to the inlet, with a pressure loss across the valve from the inlet to the at least one outlet being as low as 3 psi.

In one preferred embodiment, the fluid control valve includes a thermally responsive actuating assembly and a body having an inlet, a first outlet, at least a second outlet and a valve seat formed internally of the inlet. The valve seat and inlet are preferably centered about and axially spaced apart along a first valve axis with the first and second outlets being preferably centered about and spaced apart along a second valve axis extending perpendicular to the first valve axis. The first valve axis is preferably centered between the first and second outlets. A cover plate is engaged with the body to support the thermally responsive actuating assembly and preferably includes an opening formed therein circumscribing the first axis. A sealing assembly is supported in a seated position by the thermally responsive actuating assembly; and the sealing assembly has an unseated position upon operation of the actuating assembly.

The sealing assembly is disposed within the body and preferably includes a sealing member having a sealing surface for engaging the valve seat in the seated position and an impact surface for redirecting fluid from the inlet to the first and second outlets in the unseated position. A preferred embodiment of the sealing member and impact surface preferably includes a first concave surface and a second concave surface, the first and second concave surfaces being disposed about a central plane bisecting the sealing member. In a preferred sealing assembly, a rod member extends from the sealing member and is aligned with the first valve axis. The rod member has an outer surface in a surface engagement with the opening of the cover plate and/or the actuating assembly to orient the sealing member such that the impact surface directs fluid flow to the outlets and for a preferred embodiment preferably orients the central plane bisecting the sealing member perpendicular to the second valve axis with the first valve axis disposed in the central plane.

In another embodiment of a fluid control valve, a preferred thermally responsive actuating assembly is provided. The fluid control valve has a body including an inlet passageway, at least one discharge passageway outlet and a valve seat formed internally of the inlet passageway. The inlet passageway is preferably centered and axially aligned along a first valve axis with the at least one discharge passageway aligned along a second valve axis intersecting the first valve axis. A sealing assembly has a seated position seated against the valve seat and an unseated position spaced from valve seat. The sealing assembly preferably includes a rod member for axial translation along the first axis. A preferred thermally responsive actuating assembly controls the position of the sealing assembly between the seated and the unseated position. The thermally responsive actuating assembly includes a thermally responsive element and a base mounted to the valve body which includes a hook and a window. The window is aligned with the first axis and rod member of the sealing assembly. The thermally responsive actuating assembly includes a preferred lever member having a first end and a second end with an upper surface and bottom surface extending from the first end to the second end. The upper surface defining a profile for engaging the hook member and seating the thermally responsive element and the bottom surface defines a preferred planar profile from the first end to the second end for spanning across the window in surface contact with the base to maintain the sealing assembly in the seated position.

Although the Disclosure of the Invention and the preferred fluid control arrangements address the disadvantages and/or complexities of known fluid control valves, it is to be understood that any combination of fluid control valve features including combinations which result in equivalent performance to known fluid control features is covered. The Disclosure of the Invention is provided as a general introduction to some embodiments of the invention, and is not intended to be limiting to any particular configuration. It is to be understood that various features and configurations of features described in the Summary of the Invention can be combined in any suitable way to form any number of embodiments of the invention. Some additional example embodiments including variations and alternative configurations are provided herein.

BRIEF DESCRIPTION OF DRAWINGS

The accompanying drawings, which are incorporated herein and constitute part of this specification, illustrate exemplary embodiments of the invention, and, together with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1A:
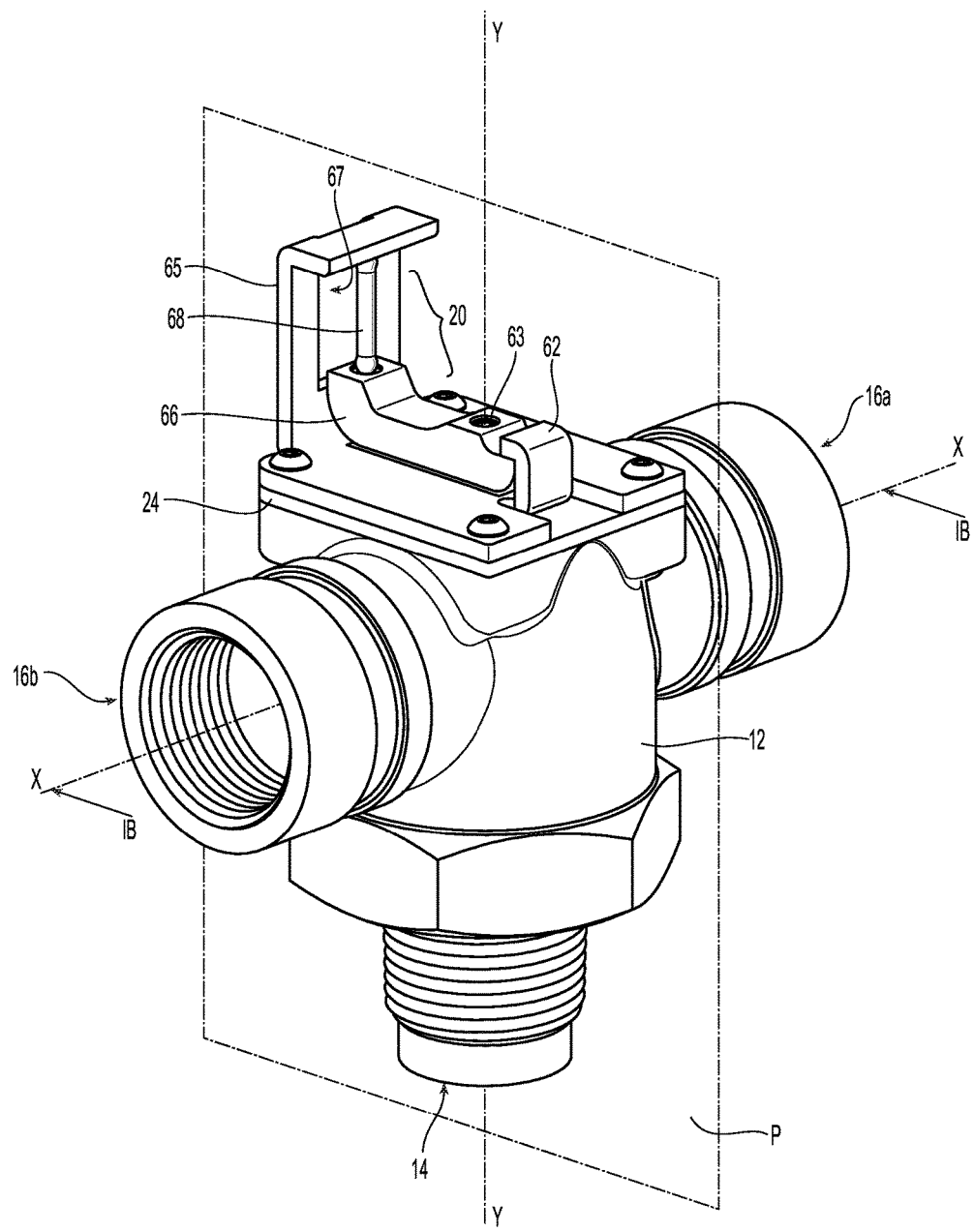
FIG. 1A is a perspective view of a preferred embodiment of a thermally responsive fluid control valve.
Figure 1B:
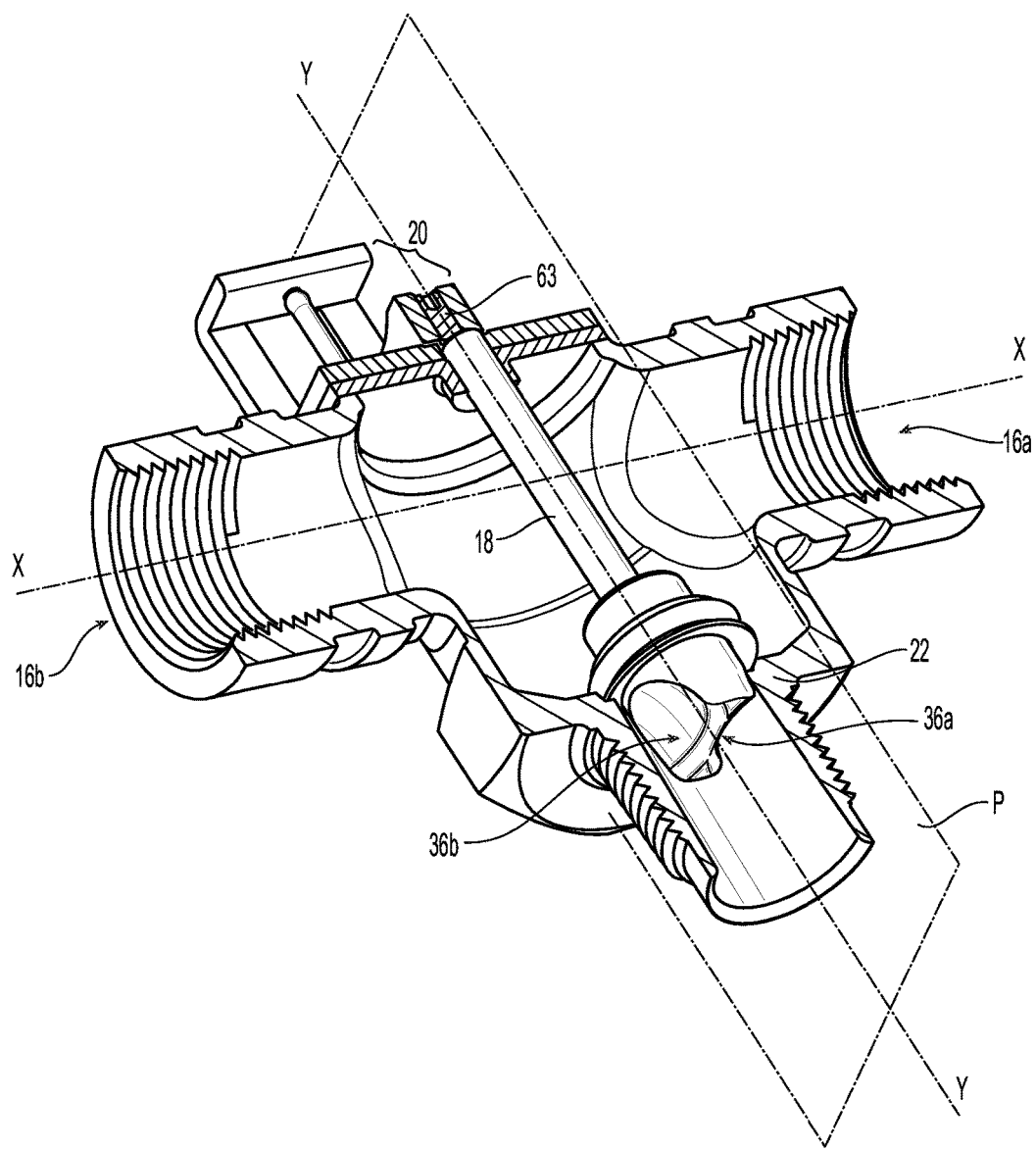
FIG. 1B is a perspective partially cross-sectional view showing a schematic elevation view of the valve of FIG. 1A along line IB-IB.

Shown in FIGS. 1A-1B are perspective views of an illustrative embodiment of a preferred thermally responsive fluid control valve 10. The preferred valve 10 includes a body 12 having an inlet 14 for the receipt of a fluid from a fluid supply such as, for example, a supply of firefighting fluid; and one and more, preferably more than one, outlet 16 for the discharge of the fluid for delivery, for example, to a fluid distribution device such as, for example, a fire protection sprinkler. To control the flow of fluid through the body 12 from the inlet 14 to the outlet(s) 16, the control valve 10 includes a preferred internal sealing assembly 18 and a thermally responsive actuating assembly 20 to unseat the sealing assembly in a preferred manner described herein.

Referring to the preferred embodiment shown in FIGS. 1A, 1B, 2A and 2B, the valve body 12 includes a single inlet 14, a first outlet 16a, a second outlet 16b and a valve seat 22 formed internally of the inlet 14. Each of the valve seat 22 and inlet 14 are preferably centered about and axially spaced apart along the first valve axis Y-Y to define an inlet passageway 15. The inlet passageway 15 is preferably tapered to define a narrowing internal diameter in the direction from the inlet 14 to the valve seat 22. Alternatively, the inlet passageway 15 can define a constant diameter. The outer surface of the inlet passageway is configured for connection to a fluid supply pipe and is preferably threaded, such as for example having an NPT thread, for connection to a pipe union or other appropriate pipe fitting. The preferred first and second outlets 16a, 16b are preferably centered about and spaced apart along a second valve axis X-X extending perpendicular to the first valve axis Y-Y, which is preferably centered between the first and second outlets 16a, 16b. Accordingly, for the preferred embodiment, the outlets 16a, 16b are shown with their centers axially aligned. Alternatively, the outlets 16a, 16b can be angled with respect to one another in the plane P defined by the intersection of the X-X and Y-Y axes or alternatively be angled with respect to one another about the Y-Y axis.

The fluid control valve 10 includes a cover plate 24, which is preferably disposed perpendicular to the first valve axis Y-Y. The cover plate 24 is engaged with and more preferably mounted and/or affixed to the valve body 12 preferably to one side of the second valve axis X-X opposite the inlet 14. The cover plate 24 is preferably a substantially planar member to support a thermally responsive actuating assembly and more particularly support the preferred embodiments of a thermally responsive actuating assembly 20 described herein. To facilitate the preferred arrangement between the actuating assembly 20 and the internal sealing assembly 18, the preferred cover plate 24 includes an opening 24a formed therein preferably circumscribing the first sprinkler axis Y-Y.

Figure 2A:
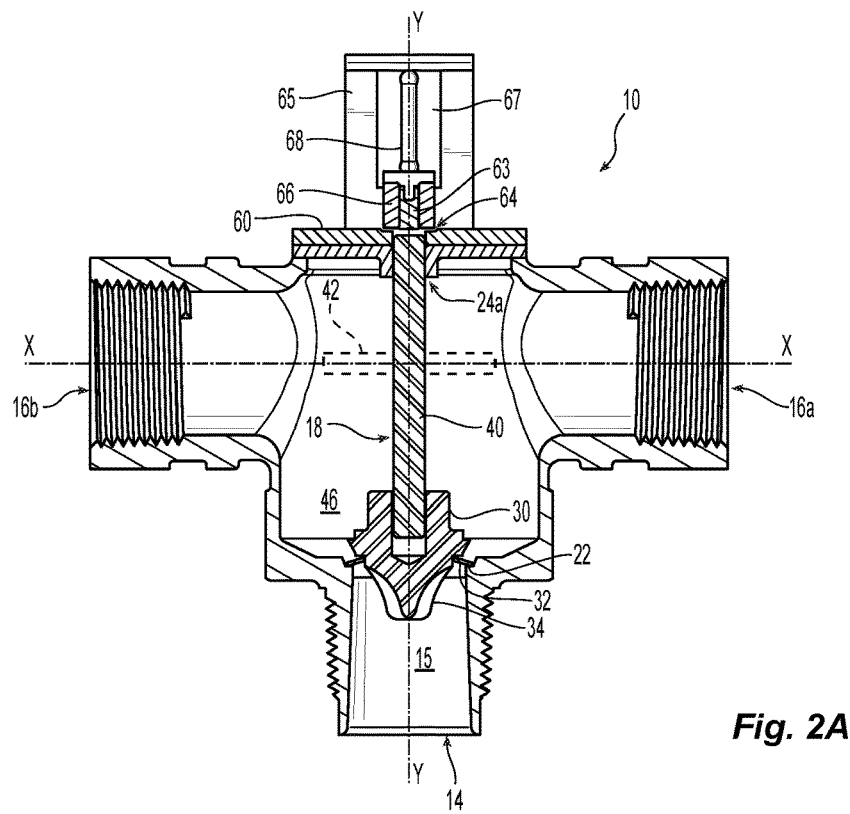
FIGS. 2A-2B are cross-sectional views of the fluid control valve of FIG. 1A in respective unactuated and actuated states.
Figure 2B:
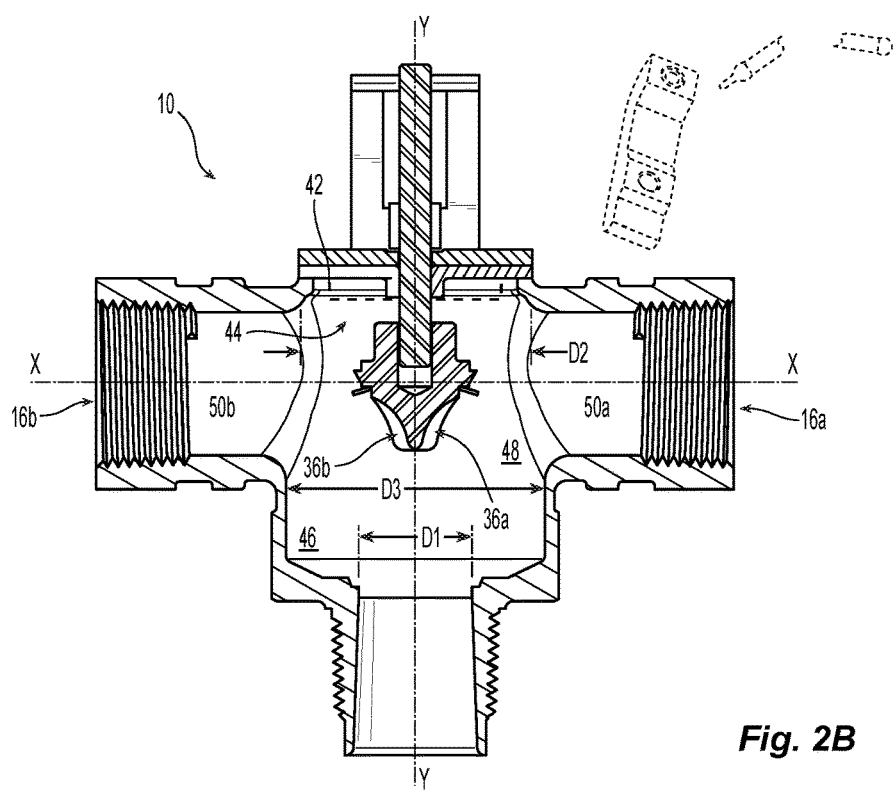

The thermally actuating assembly 20 is arranged with the internal sealing assembly 18 to support the sealing assembly 18 in a seated position against the valve seat 22, as seen in FIG. 2A. In the seated position, the sealing assembly 18 occludes the inlet passageway 15. In response to a fire, the actuating assembly 20 operates to remove its support of the sealing assembly 18 and permits the sealing assembly 18 to take an unseated position spaced from the valve seat 22, as seen in FIG. 2B to define an actuated state of the control valve 10. With the sealing assembly 18 in the unseated position, the inlet passageway 15 is open to permit fluid delivered to the inlet 14 to flow to each of the preferred discharge outlets 16a, 16b.

Figure 2C:
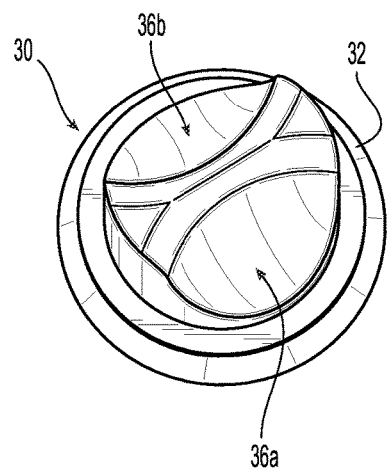
FIG. 2C is a perspective view of a preferred impact surface of a sealing member for use in the fluid control valve of FIG. 1A.
Figure 2D:
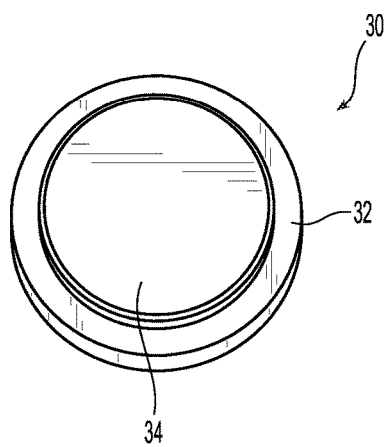
FIG. 2D is a perspective view of another preferred impact surface of a sealing member for use in the fluid control valve of FIG. 1A.

The preferred internal sealing assembly 18 includes a sealing member 30 having a sealing surface 32 for engaging the valve seat 22 in the seated position. The sealing surface 32 is preferably provided by a preferably deformable Belleville spring member, disc or ring affixed about the sealing member 30. The sealing member also includes below or distal of the sealing surface 32, an impact surface 34. The impact surface 34 and/or internal valve seat 22 can define surface geometries and/or dimensions, provided the flow from and pressure loss across the valve is within a preferred range as described herein. In preferred embodiments, the impact surface 34 can be configured for redirecting the flow of fluid delivered to the inlet 14 to flow preferably toward each of the first and second outlets 16a, 16b in the unseated position of the sealing assembly 18. As seen in FIG. 2C, a preferred impact surface 34 defines a profile to affect the desired redirection of fluid flow toward the outlets 16a, 16b. The preferred impact surface 34 includes a first concave surface 36a and a second concave surface 36b disposed about a central plane P bisecting the sealing member 30. When installed in the valve assembly, the sealing member 30 and its impact surface 34 are preferably symmetric about the central plane P; and thus, the first and second concave surfaces 36a, 36b preferably mirror one another about the central plane P. In a preferred embodiment of the sealing member 30, each of the first and second concave surfaces 36a, 36b defines a portion of a sphere having a preferably constant spherical radius of curvature across the concave surface. For the preferred valve body 12 in which the valve seat 22 defines a preferred diameter D1 of 1.30 inches, the preferred spherical concave surfaces 36a, 36b define a spherical radius of 0.45 inches, a preferred spherical radius-to-seat radius ratio that ranges from 0.65:1 to 0.7:1 and is preferably 0.68:1. The impact surface 34 can define alternate geometries. For example, the embodiment of the impact surface 34 shown in FIG. 2D, a preferred impact surface 34 can be substantially planar disposed perpendicular to the axis Y-Y.

Referring again to FIGS. 2A and 2B, the sealing assembly 18 further includes a rod member 40 extending from the upper or proximal surface of the sealing member 30 opposite the impact surface 34 and preferably axially aligned with the first valve axis Y-Y to preferably control both the axial translation and the orientation of the sealing member 30 between the seated position and the unseated position. The rod member 40 can be a unitary member or alternatively include more than one member. The preferred rod member 40 has an outer surface in a surface engagement with the opening of the cover plate to maintain a preferred orientation of the sealing member 30, for example, to orient the impact surface 34 to appropriately redirect the fluid flow to the discharge outlets 16a, 16b in the unseated position of the sealing assembly 18. In a preferred assembly, the cover plate opening 24a defines a rectangular geometry and the rod member 40 defines a preferably corresponding rectangular outer surface for a preferred surface engagement with the cover plate opening 24a to prevent rotation about the first valve axis Y-Y. The outer surface of the rod member 40 and/or the cover plate opening 24a can define alternate geometries, such as for example other non-circular geometries, to prevent rotation of the sealing assembly 18 out of the desired orientation.

The size and/or geometry of the sealing member 30 can limit the axial travel of the sealing assembly 18 from the seated position to the unseated position. Alternatively, the sealing assembly 18 can include a physical limit or projection, such as for example a stopper 42 affixed along the rod member 40 to control axial travel of the sealing assembly 18. In a preferred embodiment, the stopper 42 is a substantially planar member that is preferably substantially aligned with the second valve axis X-X in the seated position of the sealing assembly 18 and in a surface engagement with the cover plate in the unseated position of the sealing assembly 18. In a preferred arrangement, the stopper 42 is located along the rod member 40 to define a preferred axial translation of the sealing assembly from the seated position to the unseated position, which can range from 1.25 inches to 1.5 inches. Accordingly, the preferred sealing assembly 18 in its unseated position defines a maximum sealing surface-to-valve seat distance which ranges from 1.25 inches to 1.5 inches. The preferred valve body 12 can define an internal geometry to house the stopper in a first internal chamber 44 centered about the first valve axis Y-Y in the unseated position of the sealing assembly 18. The first internal chamber 44 preferably circularly circumscribes the first valve axis Y-Y to define a diameter D2 that is preferably greater than the diameter D1 of the valve seat 22 and is preferably axially spaced from the valve seat 22 such that the sealing member 30 intersects the second valve axis X-X in the unseated position of the sealing assembly. In one preferred aspect, the sealing member 30 is located in the unseated position to produce a desired flow through the valve 10 as described herein.

The preferred body 12 also defines a second internal chamber 46 axially spaced from the first chamber 44 and adjacent the valve seat 22 for housing at least a portion of the sealing member 30 in the seated position of the sealing assembly 18. In the preferred embodiment of the valve body 12, the second internal chamber 46 defines a diameter D3 that is preferably greater than each of the diameter D2 of the first chamber and the valve seat diameter D1. Preferably formed between the first and second internal chambers 44, 46 is a third internal chamber 48 to house the sealing member 30 in the unseated position of the sealing assembly 18, as seen in FIG. 2B. Given the relative dimensions between the first and second chambers 44, 46, the third internal chamber 48 is preferably substantially frustoconical in shape.

Preferably extending from the third chamber 48 to the first outlet 16a is a first discharge passageway 50a and preferably extending from the third chamber 48 to the second outlet 16b is a second discharge passageway 50b. In the preferred embodiment of the valve body 12 the internal diameter from the discharge passageway 50a, 50b to the outlets 16a, 16b is preferably constant and more preferably a common diameter. In a preferred embodiment, the discharge passageways 50a, 50b and outlets 16a, 16b define a preferred common internal diameter of 1¼ inches. The discharge passageways 50a, 50b and outlets 16a, 16b are shown as internally threaded ends, but can be appropriately alternatively configured for connection to any suitable piping or pipe fitting. As shown, the discharge passageways 50a, 50b are preferably axially aligned with one another, but can be angled with respect to one another in the plane defined by the intersection of the X-X and Y-Y axes or alternatively be angled with respect to one another about the Y-Y axis.

When the valve 10 is connected to a fluid supply line, internal sealing assembly 18 is biased to the unseated position by the fluid pressure received at the inlet 14 and acting on the impact surface 34 of the sealing member 30. To control or limit the translation of the sealing assembly 18 from the seated position to the unseated position is a thermally responsive actuating assembly 20. Referring to FIGS. 1A, 2A, 2B and 3, one embodiment of the actuating assembly 20 includes a support base 60 that is mounted and preferably affixed to the cover plate 24. The preferred base 60 includes a hook member 62 and a first window 64 formed in the base 60. Upon mounting the base 60, the window 64 is aligned with the opening 24a of the cover plate 24 such that the rod member 40 can penetrate the window 64 when the sealing assembly 18 translates from the seated position to the unseated position. Accordingly, in a preferred embodiment, when the base 60 is mounted on the cover plate 24, the window 64 is axially aligned with the first valve axis Y-Y and the rod member 40. The hook member 62 generally forms a notch or groove alone or in combination with the base 60 to support a lever member 66. For example, in the embodiment of FIG. 1A, the hook member 62 includes a first portion that extends vertically from the base 60 and a second portion that is angled with respect to the first portion to form an L-shaped notch for acting on the lever member 66 of the actuating assembly 20.

Figure 3:
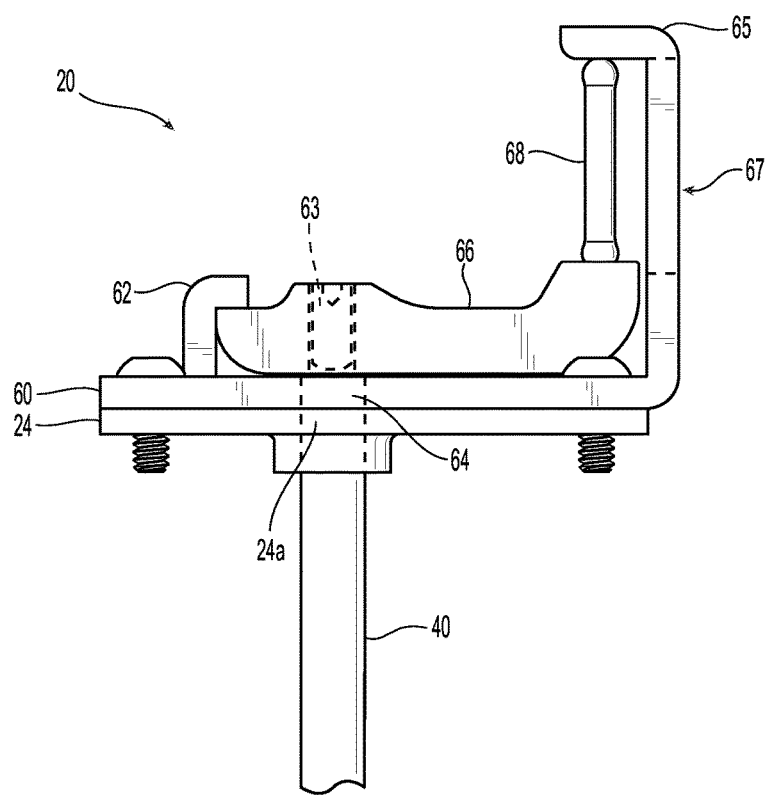
FIG. 3 is a detailed view of a preferred embodiment of a thermally responsive actuating assembly for use in the fluid control valve of FIG. 1A.

As shown, the lever member 66 of the actuating assembly 20 has a first end portion in a pivoted preferably frictional engagement with the hook member 62. The hook member 62 is preferably oriented with respect to the window 64 so that the lever member 66 extends across the window 64 to act on the axially extending rod member 40 and support the sealing assembly 18 in the seated position. A second end portion of the lever member 66 is engaged by a thermally responsive element 68 to statically maintain the lever member 66 across the window to support the sealing assembly 18 in the seated position of FIG. 2A and define an unactuated state of the actuating assembly 20 and fluid control valve 10. With the sealing assembly 18 under fluid pressure, the rod member 40 acts on the lever member 66 to bias the lever member 66 to pivot about or out of its engagement with the hook member 62. The thermally responsive element 68 statically maintains the lever member 66 to counter the moment of the sealing assembly 18 under delivered fluid pressure. Accordingly as seen in FIG. 1A and FIG. 3, the thermally responsive element 68 is off-set and spaced from the hook member 62 to provide an appropriate mechanical advantage to counter the moment of the sealing assembly 18. To adjustably and fully position the sealing assembly in the seated position, the lever member 66 preferably includes a threaded bore with a compression screw 63 disposed therein. With the lever member 66 in its unactuated position, the compression screw 63 preferably acts upon the sealing assembly 18 and preferably the rod member 40 to load and seat sealing assembly against the internal valve seat 22.

The lever member 66 is preferably configured to facilitate assembly of the actuating assembly 20 and seating of the internal sealing assembly 18. More specifically, the lever has an upper surface profile and a bottom surface profile to define a lever height or thickness that can slide into engagement with the hook 62, seat the thermally responsive element 68 and provide access to the compression screw 63. The bottom surface of the lever member 66 is substantially planar from its first end to second end and preferably to each side of the threaded bore housing the compression screw 66. By providing a planar bottom surface, the lever member can be slid into its unactuated position across the window 64. The planar surface also stabilizes the lever member 66 in surface contact against the base 60 to seat the thermally responsive element 68 and engage the compression screw.

The thermally responsive element 68 is preferably a thermally responsive frangible glass bulb. Alternatively, the element 68 can be an appropriately configured strut and hook assembly with a thermally responsive link. In the presence of a sufficient level of heat, the thermally responsive element 68 ruptures or collapses. Without the element 68 in place, the lever member 66 is free to pivot about or displace out of its engagement with the hook member by the force of the translating sealing assembly 18 under fluid pressure. With the lever member 66 cleared of the window 64, the sealing assembly 18 is clear to axially translate to its unseated position as seen in FIG. 2A.

Figure 3A:
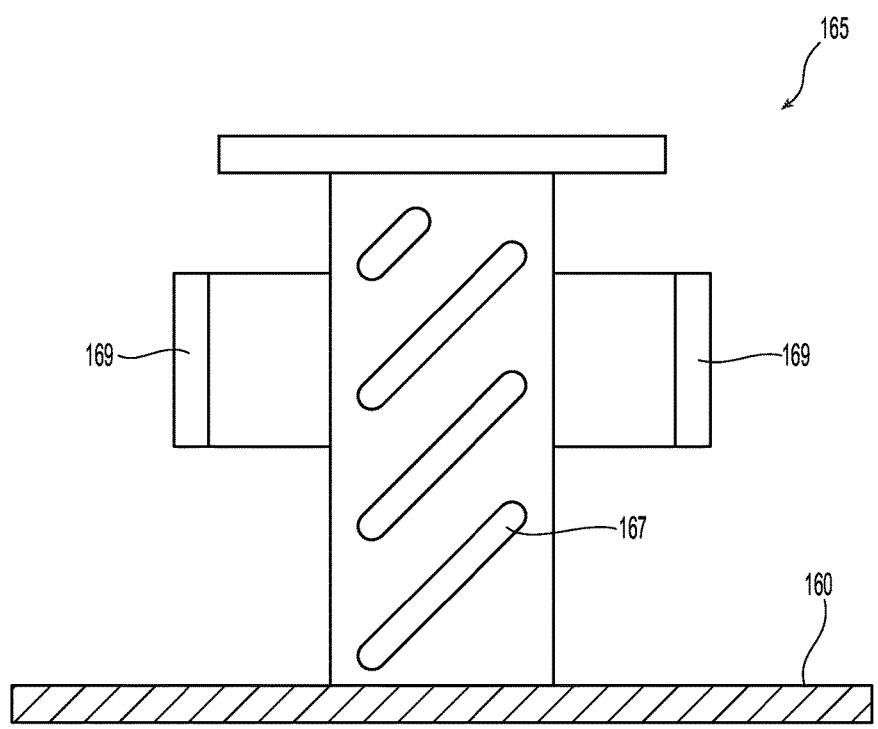
FIG. 3A is an embodiment of a shield for use in the thermally responsive actuating assembly of FIG. 3.

To protect the thermally responsive element 68, the base 60 can include a shield 65 to partially surround the preferred bulb 68 or other trigger. The shield 65 preferably includes a second window 67 to provide an avenue through which heat can flow and impact the thermally responsive element 68. In FIGS. 1A and 3, the second window 67 is generally a rectangular window with a sufficient area through which heat can flow. Shown in FIG. 3A is an alternate embodiment of a shield 165 extending from the base 60 for use in actuating assembly 20. The shield 165 includes a preferably slotted window 167 and more preferably, a plurality of slotted windows 167. The slots 167 are preferably sized to be sufficiently wide to permit heated air to flow therethrough, and sufficiently narrow to provide impact protection. The slots 167 are substantially oval and elongated in shape. Multiple windows of alternate geometries or shapes can be used in the alternative. The shield 165 can additionally include lateral guards or shielding wings 169 to protect the thermally responsive element 168 with lateral impact protection.

The thermally responsive element 68 has a thermal sensitivity or responsiveness that is preferably characterized as a "quick" or "fast" response. Thermal responsiveness or sensitivity can be defined as the rapidity with which a trigger operates in response to a fire or other heat source. A thermally responsive glass-bulb type thermal trigger, as used for example in the preferred fluid control valve 10 or an automatic fire protection sprinkler, contains an expansible liquid that expands with rising temperatures to cause the glass bulb to break into small fragments at a predetermined nominal release temperature range, i.e., the nominal temperature rating, thereby actuating the sprinkler. One measure of thermal sensitivity of a heat responsive element or trigger is the Response Time Index or "RTI," which is related to the thermal inertia of the element. According to the description in U.S. Pat. No. 5,829,532, when "fast response" was being investigated in the 1980's, "standard sprinklers" were found to have an RTI of more than 100 $\text{meter}^{1/2}\text{second}^{1/2}$ ("$m^{1/2}\text{sec}^{1/2}$") or more typically up to nearly 400 $m^{1/2}\text{sec}^{1/2}$; and for sprinklers that were found to thermally respond faster than standard sprinklers, the RTI was found to be less than 100 $m^{1/2}\text{sec}^{1/2}$. Currently under National Fire Protection Association (NFPA) Standard, "NFPA 13: Standard for the Installation of Sprinkler Systems," ("NFPA 13") (2013 ed.), Section 3.6.1, a "fast response" sprinkler is defined as a sprinkler having a thermal element with an RTI of 50 $m^{1/2}\text{sec}^{1/2}$ or less; and a "standard response" sprinkler is defined as a sprinkler having a thermal element with an RTI of 80 $m^{1/2}\text{sec}^{1/2}$ or more. Historically, a class of "special" faster operating sprinklers had been recognized as having RTI's between 80 and 50 $m^{1/2}\text{sec}^{1/2}$. For one type of fast-response sprinkler, the early suppression fast response ("ESFR") sprinkler, the thermal trigger has an RTI of 50 $m^{1/2}\text{sec}^{1/2}$ or less, more particularly 40 $m^{1/2}\text{sec}^{1/2}$ and even more particularly 19 to 36 $m^{1/2}\text{sec}^{1/2}$. It was once believed for fast-growing industrial fires of the type to be protected by ESFR sprinklers that the RTI and the temperature rating together ensured adequate fast sprinkler response. Accordingly, some ESFR sprinklers include a trigger having an RTI of less than 40 $m^{1/2}\text{sec}^{1/2}$ and a temperature rating of 165° F. or 214° F. However, as described in U.S. Pat. No. 5,829,532 one embodiment of a sprinkler provided suppression of a high challenge fire with a trigger having an RTI of less than 100 $m^{1/2}\text{sec}^{1/2}$. Accordingly, as used herein, fast-response triggers can be characterized by RTI's of less than 100 $m^{1/2}\text{sec}^{1/2}$; 80 $m^{1/2}\text{sec}^{1/2}$ or less; 50 $m^{1/2}$ $\text{sec}^{1/2}$ or less; 40 or less $m^{1/2}\text{sec}^{1/2}$ or ranging between 19 to 36 $m^{1/2}\text{sec}^{1/2}$.

Figure 4:
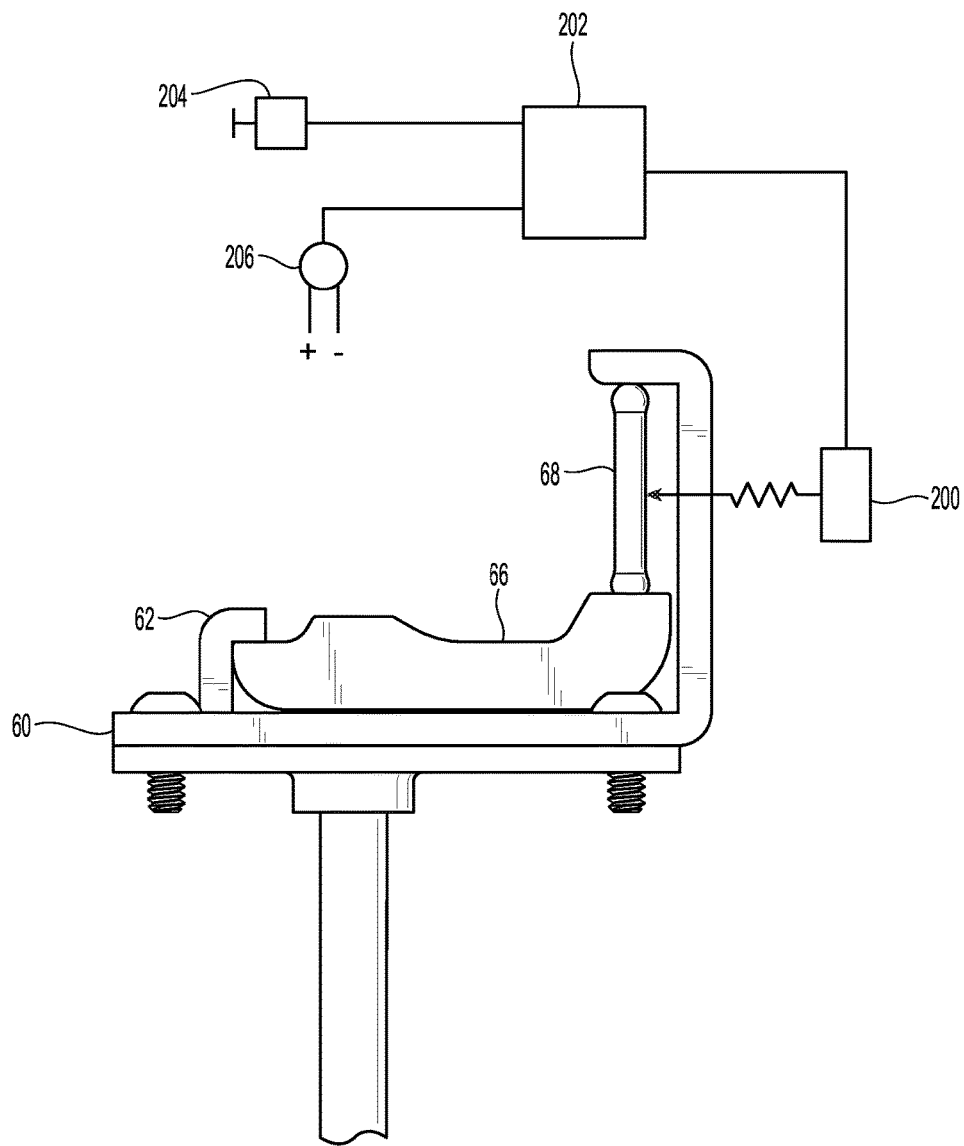
FIG. 4 is a schematic view of a preferred electrically controlled installation of the actuating assembly of FIG. 3.

Preferred embodiments of the fluid control valve 10 can be installed for only a thermal actuation response to a fire. Alternatively or additionally, the fluid control valve 10 can be installed for an electrically controlled actuation in response to a manually operated trigger or an electric control signal. Shown in FIG. 4 is a schematic view of an exemplary electric installation in which an electrically operated actuator transducer 200 is positioned proximate the thermally responsive actuator 68 to break or separate the thermally responsive element 68. The electrically operated transducer 200 can be coupled to a control panel 202 from which an actuating control signal can be generated to operate the transducer and electrically rupture the thermally responsive element 68. The actuating control signal can be generated and/or delivered by the control panel 202 in response to a signal manual actuator 204 or smoke or heat detector 206 coupled to the control panel.

In a preferred installed operation of the fluid control valve 10 in which the actuating assembly 20 operates as described, the internal sealing assembly 18 axially translates from a seated position to an unseated position and fluid flows from each of the preferred outlets 16a, 16b. A preferred fluid flow rate from the outlets 16a, 16b ranges between (80-160) GPM for a preferred operating or delivered fluid inlet pressure of (25-45) PSI delivered to the inlet 14. Moreover, the preferred fluid control valve 10 experiences a preferred pressure drop across the valve 10 as low as 3 psi. and more preferably ranging as low as from about 0.3 psi. to about 2.9 psi. Accordingly, the preferred fluid control valve 10 defines a discharge-to-inlet pressure ratio of up to 0.8. It is believed that the preferred thermally responsive fluid control valve 10 provides for a fluid flow rate not previously experienced in prior known thermally responsive fluid control valves. Moreover, it is believed that the fluid control valve 10 with the preferred spherical impact surface provides for desired fluid flows at lower pressure losses across the valve than had been previously known.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A fluid control valve comprising:
   a thermally responsive actuating assembly;
   a body including an inlet, a first outlet, at least a second outlet and a valve seat formed internally of the inlet, the valve seat and inlet being centered about and axially spaced apart along a first valve axis, the first and at least second outlets being centered about and spaced apart along a second valve axis extending perpendicular to the first valve axis, the first valve axis being centered between the first and second outlets;
   a cover plate engaged with the body and supporting the thermally responsive actuating assembly, the cover plate having an opening formed therein circumscribing the first axis, and
   a sealing assembly supported in a seated position by the thermally responsive actuating assembly, the sealing assembly having an unseated position upon operation of the actuating assembly, the sealing assembly being disposed within the body and including:
      a sealing member having a sealing surface for engaging the valve seat in the seated position and an impact surface for redirecting fluid from the inlet to the first and second outlets in the unseated position, the impact surface including a first concave surface and a second concave surface, the first and second concave surfaces being disposed about a central plane bisecting the sealing member; and
      a rod member extending from the sealing member and aligned with the first valve axis, the rod member having an outer surface in a surface engagement with the opening of the cover plate to orient the sealing member such that the central plane bisecting the sealing member is oriented perpendicular to the second valve axis with the first valve axis disposed in the central plane.

2. The fluid control valve of claim 1, wherein the impact surface of the sealing member is symmetrical about the central plane.

3. The fluid control valve of claim 1, wherein each of the first and second concave surfaces defines a portion of a sphere having a constant spherical radius of curvature across the concave surface.

4. The fluid control valve of claim 1, wherein the valve seat defines a seat diameter to define a spherical radius-to-seat diameter ratio that ranges from 0.65:1 to 0.7:1.

5. The fluid control valve of claim 1, wherein the cover plate opening defines a rectangular geometry, the rod member defining a rectangular outer surface in a surface engagement with the cover plate opening to prevent rotation about the first valve axis.

6. The fluid control valve of claim 1, wherein the sealing assembly includes a stopper disposed along the rod member to control axial travel of the sealing assembly along the first valve axis, the stopper substantially aligned with the second valve axis in the seated position of the sealing assembly and in a surface engagement with the cover plate in the unseated position of the sealing assembly.

7. The fluid control valve of claim 6, wherein the stopper is located along the rod member to define an axial translation of the sealing assembly from the seated position to the unseated position of 1.5 inches.

8. The fluid control valve of claim 6, wherein the body defines an internal chamber centered about the first valve axis for housing the stopper in the unseated position of the sealing assembly, the internal chamber being axially spaced from the valve seat such that the sealing member intersects the second valve axis in the unseated position of the sealing assembly.

9. The fluid control valve of claim 8, wherein the internal chamber for housing the stopper defines a first internal chamber, the body defines a second internal chamber axially spaced from the first internal chamber and adjacent the valve seat for housing at least a portion of the sealing member in the seated position of the sealing assembly, the second internal chamber defining a diameter greater than the diameter of the first internal chamber and the valve seat diameter.

10. The fluid control valve of claim 9, further comprising a third internal chamber extending between the first and second internal chambers, a first discharge passageway extending from the third internal chamber to the first outlet and a second discharge passageway extending from the third internal chamber to the second outlet, each of the first discharge passageway, first outlet, second discharge passageway and second outlet defining a constant diameter.

11. The fluid control valve of claim 1, defining a discharge-to-inlet pressure ratio of up to 0.8.

12. The fluid control valve of claim 1, wherein each of the first and second outlets defines a constant diameter of 1¼ inch.

13. The fluid control valve of claim 1, wherein the thermally responsive actuating assembly includes:
   a support base including a hook member and a window formed therein, the window overlapping the opening of the cover plate such that the rod member can penetrate the window in the unseated position of the sealing assembly;
   a lever member having a first end portion and a second end portion extending across the window to support the sealing assembly in the seated position, the first end portion of the lever member being in pivoted engagement with the hook member; and a thermally responsive element engaged with the second end portion to statically maintain the lever member across the window and define an unactuated state of the actuating assembly.

14. The fluid control valve of claim 13, wherein the first end portion of the lever member includes a first segment extending parallel to the support base and a second segment angled with respect to the first segment.

15. The fluid control valve of claim 14, wherein the lever member includes a third segment connecting the first and second segments, the third segment being angled with respect to the first and second segments.

16. The fluid control valve of claim 14, wherein the second end portion extends parallel to the base portion and perpendicular to the first valve axis.

17. A fluid control valve comprising:
a body including an inlet passageway, at least one discharge passageway outlet and a valve seat formed internally of the inlet passageway, the inlet passageway being centered and axially aligned along a first valve axis, the at least one discharge passageway being aligned along a second valve axis intersecting the first valve axis;
a thermally responsive actuating assembly having a base mounted to the body; and
a sealing assembly supported in a seated position by the thermally responsive actuating assembly, the sealing assembly having an unseated position upon operation of the actuating assembly to provide a fluid flow rate ranging between (80-160) GPM for a delivered fluid inlet pressure of (25-45) PSI to the inlet passageway, with a pressure loss across the valve from the inlet passageway to the at least one discharge passageway outlet being as low as 3 psi;
wherein the sealing assembly includes a sealing member having a sealing surface for engaging the valve seat in the seated position and an impact surface for redirecting fluid from the inlet passageway to the at least one discharge passageway outlet in the unseated position, the impact surface including a first concave surface and a second concave surface, the first and second concave surfaces being disposed about a central plane bisecting the sealing member, and a rod member extending from the sealing member and aligned with the first valve axis, the rod member having an outer surface in a surface engagement with the thermally responsive actuating assembly to orient the sealing member.

18. The fluid control valve of claim 17, wherein the unseated position of the fluid control valve defines a discharge-to-inlet pressure ratio of up to 0.8.

19. The fluid control valve of claim 17, wherein the sealing assembly defines a maximum sealing surface-to-valve seat distance which ranges from 1.25 inches to 1.5 inches when the sealing assembly is in the un-seated position.

20. A fluid control valve comprising:
a body including an inlet passageway, at least one discharge passageway outlet and a valve seat formed internally of the inlet passageway, the inlet passageway being centered and axially aligned along a first valve axis, the at least one discharge passageway being aligned along a second valve axis intersecting the first valve axis;
a sealing assembly having a seated position seated against the valve seat and an unseated position spaced from valve seat, the sealing assembly including a rod member for axial translation along the first axis; and
a thermally responsive actuating assembly to control the position of the sealing assembly between the seated and the unseated position, the thermally responsive actuating assembly including:
a thermally responsive element;
a base including a hook and a window, the base being mounted to the body with the window aligned with the first axis and rod member of the sealing assembly; and
a lever member having a first end and a second end with an upper surface and bottom surface extending from the first end to the second end, the upper surface defining a profile for engaging the hook member and seating the thermally responsive element, the bottom surface defining a planar profile from the first end to the second end for spanning across the window in surface contact with the base to maintain the sealing assembly in the seated position.

21. The valve of claim 20, wherein the lever member includes a threaded bore between the first and second ends with a compression screw engaged within the bore to act on the rod member and load the sealing assembly against the valve seat, the bottom surface being planar to each side of the threaded bore.

* * * * *